United States Patent [19]
DiPede et al.

[11] Patent Number: 5,772,944
[45] Date of Patent: Jun. 30, 1998

[54] METHOD OF MANUFACTURING PLASTIC STRAP

[75] Inventors: Sandro DiPede, North York, Canada; Russell J. Gould, Mt. Prospect, Ill.

[73] Assignee: Samuel Manu-Tech, Inc., Ontario, Canada

[21] Appl. No.: 629,162

[22] Filed: Apr. 8, 1996

Related U.S. Application Data

[62] Division of Ser. No. 148,301, Nov. 8, 1993, Pat. No. 5,525,391.

[51] Int. Cl.[6] .................................................. B29C 47/88
[52] U.S. Cl. ................................ 264/211.13; 264/176.1; 264/178 R; 264/210.7; 264/211.12
[58] Field of Search ........................... 264/210.1, 288.4, 264/289.6, 176.1, 178 R, 210.7, 211.12, 211.13

[56] References Cited

U.S. PATENT DOCUMENTS 4,022,863  8/1977  Karass et al. ........................... 264/210

Primary Examiner—Richard Weisberger
Attorney, Agent, or Firm—Baker & McKenzie

[57] ABSTRACT

A high strength polyester strap, preferably polyethylene terephthalate, suitable for higher load applications that typically require steel strapping. The strap is made by a process in which an extruded strand or sheet of polyester is subjected to a plurality of stretching steps with a final stretch ratio of at least 5 to 1. Raising the temperature of the strap in at least one of the stretching steps is preferred. In a preferred embodiment, the strap is surface treated to reduce the brittleness of the strap and to improve weldability. The profile of the strap is flattened as part of the surface treatment which treatment enhances the weldability of the strap.

11 Claims, 6 Drawing Sheets

METHOD OF MANUFACTURING PLASTIC STRAP

This is a division of application Ser. No. 08/148,301, filed Nov. 8, 1993 now U.S. Pat. No. 5,525,391.

BACKGROUND AND SUMMARY OF THE INVENTION

The present invention relates to polymer strap and methods of producing the same.

Steel and plastic strapping are used for a wide variety of applications, often to secure very large coils of steel, synthetic fiber bales and heavy palletized boxes. Steel strapping has advantages in that it has high strength and temperature resistance and outstanding creep resistance. Steel strapping is typically used on heavy loads where high strap strengths and low creep properties are required. However, steel strapping, although very useful in maintaining the quality of the packaging, may be more difficult to dispose of and the strap can have sharp edges.

Plastic strap has found particular application to lower strength packaging requirements and represents a less expensive alternative to steel strap. Plastic strap typically has an elastic behavior within limits which allows the strap to remain tight on a package even if the package collapses or somewhat consolidates. The plastic strap is easily disposed of and is safer to use than steel strap because it does not have the dangerous sharp edges of steel strap. Plastic strap is made initially from an extruded strand or sheet, and the polymeric material comprising the extrusion is then oriented, a process which increases the strength of the plastic material to approximately 10 times the unorientated strength of the material.

Plastic strap in the market place has generally been limited to applications where a tensile strength of no greater than 65,000 psi is required. Some strap manufacturers have claimed to achieve plastic strap strengths in excess of 75,000 psi using PET after a two-stage stretching technique. See U.S. Pat. No. 4,022,863 to Karass et al. However, the workability and operability of the Karass process is questionable, particularly at the moisture levels discussed in the Karass patent.

The creep properties of plastic strapping and the difficulty of securing plastic strap have limited the applications of plastic strapping. The ability to provide a weld with plastic strap is also a limitation which prevents plastic strapping from being used in higher break strength applications. It should be noted that high strength plastic fibers are known, but strapping which combines these fibers with an appropriate support substrate has limited applications.

One method of manufacturing plastic strap according to the present invention includes initially forming a molecularly oriented crystalline polyester or polyester copolymer of uniform crosssection which is many times wider than the thickness thereof. The material is oriented by longitudinal stretching at a ratio of at least 5.0 to 1.0. The longitudinal stretching may be carried out at raised temperatures with the material being maintained at this stressed condition until sufficient cooling has taken place. However, for strap with a combination of high strength and low brittleness, the third stretching stage should be conducted at temperatures at or below about 200° F. It has been found that the tensile strength of the strap can be significantly increased to at least 70,000 psi.

In one embodiment of the invention, an outer layer of amorphous material is formed on at least one and preferably both sides of the material. The outer layer may be imparted after the material has been extruded and oriented by stretching. This is done by heating the outside surface of the material by, for example, exposing the material to heated rolls. Heating the oriented material causes the molecular structure to lose its orientation, at least in part, to a depth which depends upon the extent to which the temperature of the material is raised. To control brittleness of the core, the material may be chilled just prior to the surface treatment, and may be chilled again just after the surface treatment. The outer layer is preferably unitary and integral with the underlying high strength layer, and preferably has a thickness of at least about 0.0005 inches. Strap made from material formed by the process of the present invention includes a high strength underlying layer which is highly oriented. The strap, when fused to itself via the outer layers, has a joint whose break strength is a function of the break strength of the high strength layer. The outer layer has been found to provide the strap with substantially improved corner strength. The outer layer has been found to resist crack initiation and propagation in the welded strap sections. It has been found with the strap of the present invention that the conventional hot knife welding or fusing techniques can be used to provide a weld between strap sections resulting in a connection having an overall break strength approaching the break strength of at least about 80% of the underlying high strength layer.

The formation of an outer amorphous surface by melting the extruded material may have substantial benefit even on strap of moderate strength. The melting of the outer surface improves the weldability of the strap to such an extent that it may be economically feasible to use the surface treatment aspects of the present invention without taking particular advantage of any potentially high strength of the core material.

The objects and advantages of the present invention will be better understood upon a reading of the following specification read in conjunction with the accompanying drawings.

DETAILED DESCRIPTION OF THE INVENTION

The manufacture of the high strength strap of the present invention generally entails the use of a combination of equipment long known for its use in the manufacture of plastic strap.

Figure 1:
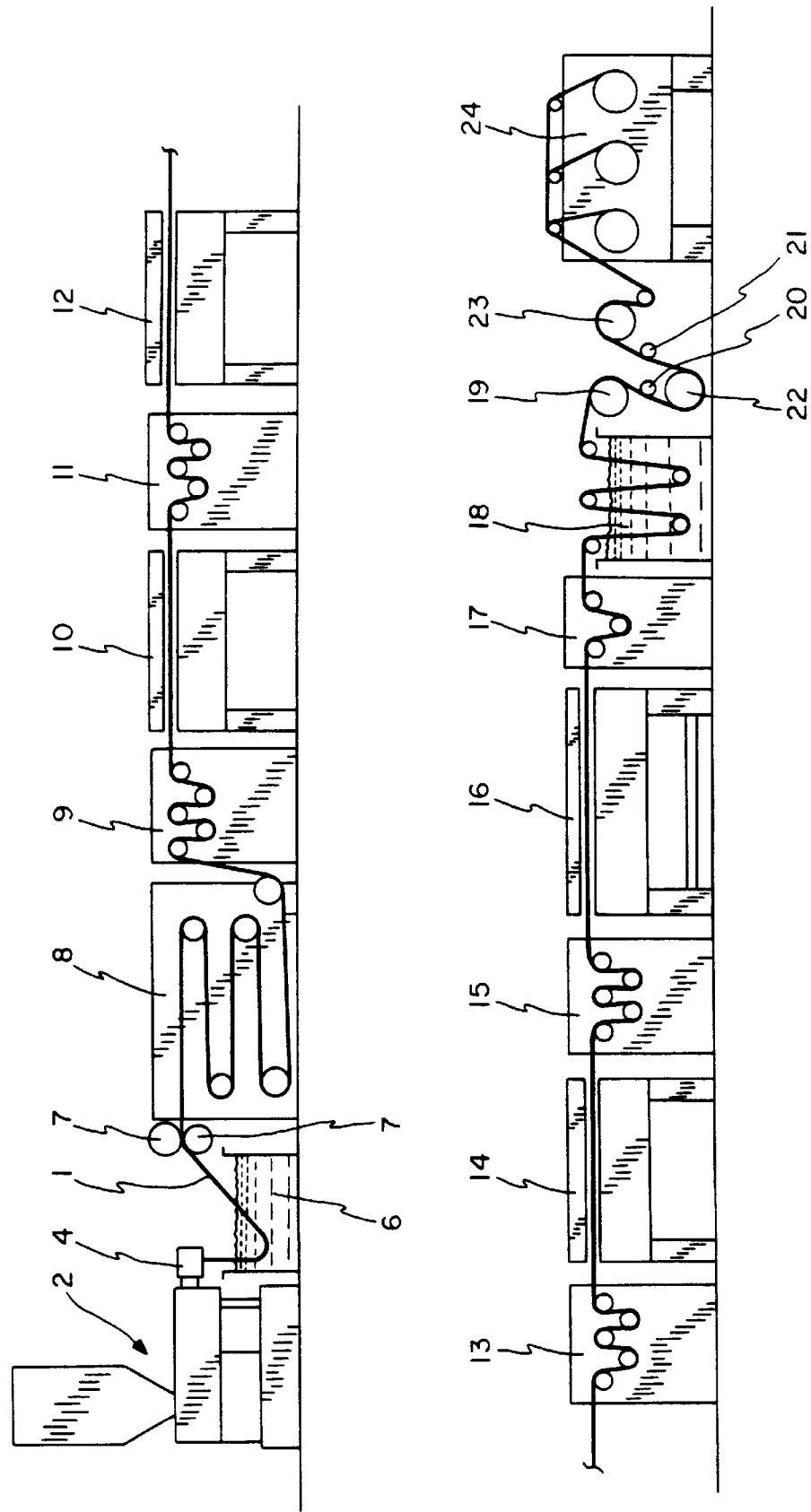
FIG. 1 is a schematic of the apparatus and method for carrying out the present invention.

FIG. 1 shows a schematic diagram of an arrangement of equipment which could be used to make strap in accordance with the present invention. Polyester material having intrinsic viscosity of between about 0.6 and about 0.8 is preferred for making strap in accordance with the present invention, although material with other intrinsic viscosity may be usable. The material is processed by conventional drying system and the material is dried at approximately 320° F. for at least 4 hours to produce a moisture level of less than 0.005%. The dried pellets are then fed to a conventional plastic extruder 2. The pellets are rendered flowable in the extruder by melting at approximately 490° F. and then forced through a gear pump which maintains uniform output of the molten plastic material which is forced through a die 4. The die produces a continuous rectangular cross section of extruded material 1 which may be a single strand, multiple strands or a sheet intended to be subsequently slit into individual straps. After exiting the die 4, the extruded material immediately enters a water bath 6 at about 80° F. to solidify the molten polyester material into a continuous amorphous state.

Referring again to FIG. 1, air in the oven 8 is maintained at a temperature of approximately 175° F., and the rolls in the heating oven 8 are arranged such that the material is not elongated in the oven but is merely heated to the desired temperature. A first series of godet rolls 9 controls the speed of the material through the heating oven 8. The material, as it exits from engagement with the first godet rolls 9, passes into a first orientation oven 10. This oven is maintained at a temperature of about 175° F. A second series of godet rolls 11 operate at a speed approximately 370% of the speed of the first series godet rolls 9. The material then passes through a second orientation oven 12 which is at a temperature of about 250° F. Uniform temperature is important to control the stretch point. A third series of godet rolls 13 have a speed of approximately 135% of the speed of the second series of godet rolls 11. This results in a stretch ratio of about 5.0 to 1.0 after the first two stretch stages.

A further orientation oven 14 is maintained at a temperature of approximately 75° F., or higher, depending upon the desired break strength and brittleness, as discussed below. A fourth series of godet rolls 15 may operate at various speeds, but in one example operated at a speed of 120% of the third series of godet rolls 13. This is followed by an annealing oven 16, and the speed of the material through the annealing oven 16 is controlled by the fifth series of godet rolls 17. The speed of the fifth series of godet rolls 17, with respect to the fourth series of godet rolls 13 is 97%, i.e. the material is allowed to relax slightly.

When the material exits from the fifth series of godet rolls 17, it is passed through a cooling bath 18 which cools the strap to about room temperature while maintaining the tension in the material 1. The material 1 is then chilled by chill rolls 19 to bring the temperature of the material well below room temperature. The refrigerated fluid is circulated in the chill roll 19. Then, a first side of the material 1 is exposed to a heated roll 20. A second chill roll 22 immediately contacts the treated amorphous outer layer. Basically, these surface treating rolls 20 and 21 provide sufficient heat to both sides of the material to melt its surface, rendering it amorphous. It is preferred that the outer layer be on both sides of the material, and that the thickness of the outer layer on each side be approximately 0.0005 of an inch. The surface treating also serves to flatten the material, rendering it uniformly shaped on the surfaces to be welded, which makes the material superior for purposes of welding a joint.

Figure 2:
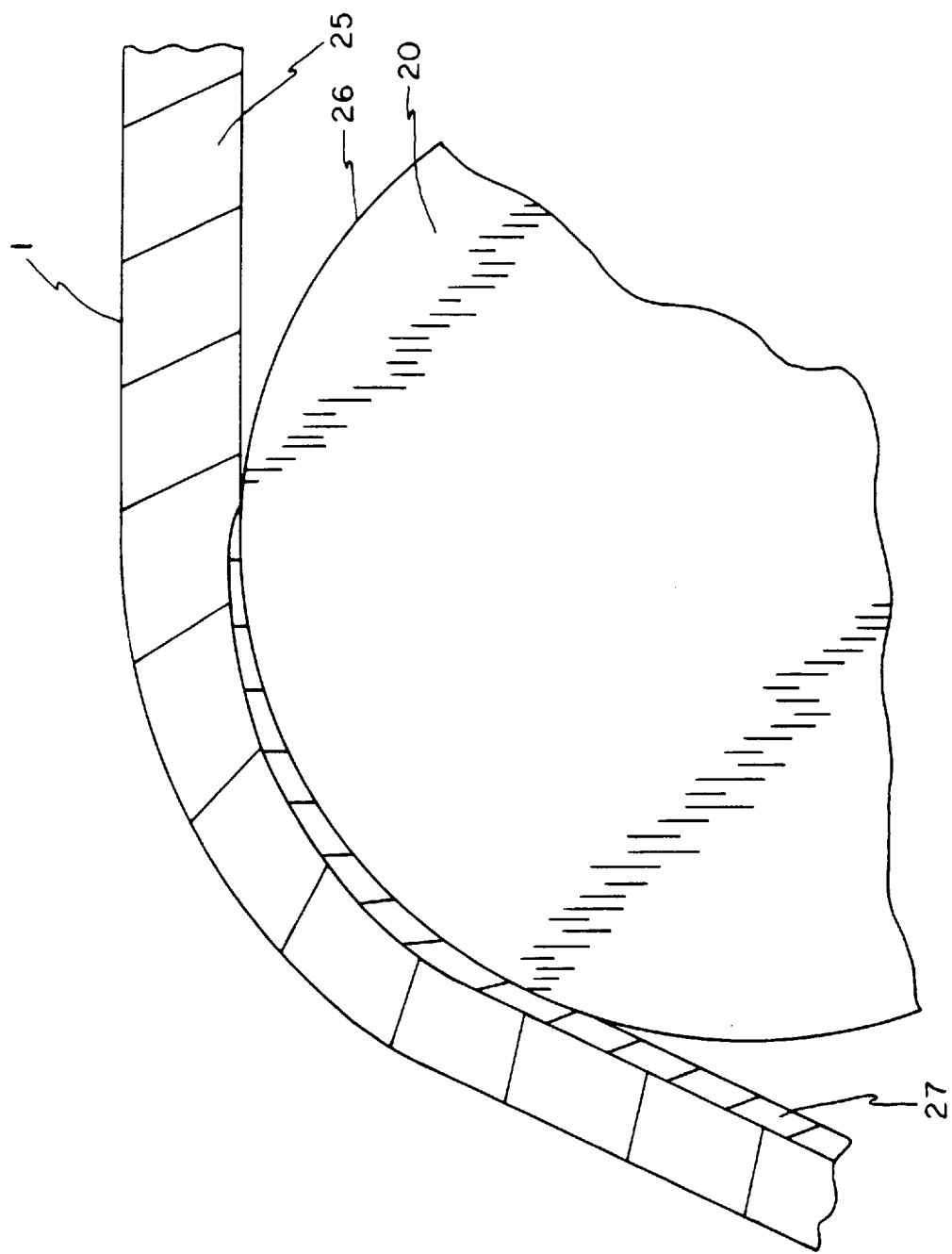
FIG. 2 is an enlarged schematic view of the formation of an outer layer of the strap of the present invention.

FIG. 2 shows a detail in schematic form of the process by which the material 1 is surface treated by a heated roller. The untreated surface material 25 of the material 1 comes into contact with the outer surface 26 of the heated roller 20 (which is at about 1000° F.) when the material 1 has just come off the chill roller 19 and is substantially below room temperature, for example, at about 0° F. As the material 1 continues its contact with the heated roller 20, the depth of surface melting increases and, because the core has been chilled, the temperature gradient across the thickness of the material 1 is steep. If it is desired to manufacture a strap having high strength, it is important to keep as much of the core as possible from reaching temperatures which would cause the core to lose its crystaline, oriented and high strength structure and cause the core to become brittle.

A number of straps may be simultaneously extruded and passed through the same equipment in a side-by-side relationship. This arrangement is generally shown in FIG. 1 as evidenced by the separate winders 28 at the winding station 24. However, it is also possible to extrude a sheet and cut or slit the sheet into appropriate strap widths at the end of the manufacturing process just before the material is wound.

The sheet method and the individual strand method of extruding and treating the material each have their advantages and disadvantages. For example, extruding a sheet may give more consistency from strap to strap with respect to strap profile. However, individual strand extrusion may provide the manufacturer with more flexibility in the manufacturing process. Further, one of the methods may require more set-up time, labor or capital investment than the other.

The surface treatment which results in the formation of the outer layer of the strap of the present invention is shown in FIG. 1 to be accomplished with heated rolls, but it should be noted that the heating could also be achieved by exposing the material to flame, heated air, or other techniques for raising the temperature of a surface. Similarly, the chilling of the material, while shown in FIG. 1 as being done with chill rolls, could be accomplished in other ways. For example, the material could be run through a chamber containing cool gas such as $CO_2$ at 0° F.

The outer layer of the strap of the present invention may also be imparted to the oriented core of the material by a co-extrusion process in which two or more materials are initially extruded. The core or innermost layer should be a polyester or polyester copolymer, preferably a polyethylene terephthalate or copolymer thereof. However, the outer layer should be a material such as PETG (1,4-cyclohexanediamethanol), PCTG (1,4⁻ cyclohexylene-dimethylene-ethylene terephthalate), or blends of PET and additives sold by Rohm & Haas under the trademark PARALOID. The outer co-extruded layer must be compatible with polyester so that it will fuse to the core. Alternatively, an intermediate co-extruded layer may be used to make the outer layer unitary with the core. If the coextrusion technique is used, it may be unnecessary to heat the material in order to create an outer layer with a suitably amorphous character to provide the strap with non-brittleness, weldability and corner strength. In addition, a multi-layer extrusion technique could be used if an outer layer is desired which does not bond, by itself, to the PET core. It may be desirable to extrude an intermediate layer between the core and the outer layer.

As used in this specification, the term "amorphous" is intended to include materials which are completely unoriented, substantially unoriented, and partially unoriented.

Figure 6:
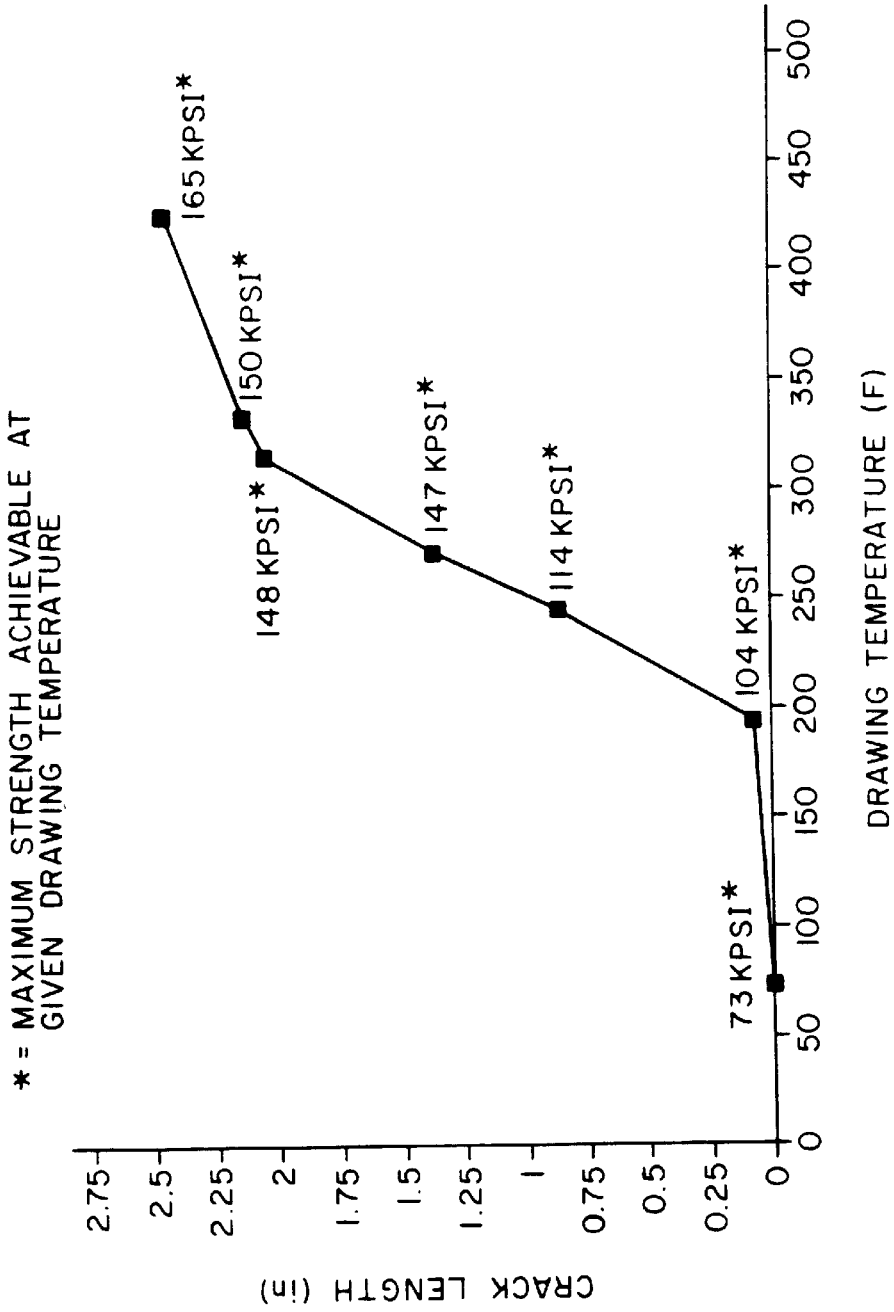
FIG. 6 is a graph showing strap brittleness versus drawing temperatures.

It has been found that a total stretch ratio of at least 5 to 1 can significantly increase the amount of orientation in the strap and the break strength can be significantly increased as a result. When using polyethylene terephthalate (PET), it has been found that a break strength of at least 70,000 psi can be accomplished, while the strap has improved properties with respect to creep resistance and stress relaxation. Further improvements in these properties can be obtained by using a stretch rate of at least 6 to 1. However, as shown in FIG. 6 and Table 1 below, such increased strength may result in increased brittleness as measured by crack length.

It has also been possible to obtain strap of high break strength and good creep and stress relaxation properties by using a process where the strap undergoes an initial stretching of approximately 3.7 to 1 followed by a further stretching of about 1.35 to 1 for a stretch ratio after two stretching stages of about 5.0 to 1.0. The first and second stretching occur at a temperature preferably in the range of about 175° F. to 250° F., respectively. When stretched a third time at a stretch ratio of 1.2, significant improvements are obtained in tensile strength. See the following Table 1.

accordance with the present invention; c) a conventional PET strap; and d) a high strength polypropylene strap. The initial stress applied to each of the straps is shown in the legend associated with the graph of FIG. 4. As can be seen, the high tensile strength steel had essentially no stress relaxation—remaining at 100% of its initial tension over the 1,000 hour time period. The high strength PET strap having an applied stress of 75,000 psi initially started at 95% and fell to approximately 88% after 1,000 hours. In contrast, the conventional PET strap indicated as 104 initially started at about 88% and dropped to approximately 60% after the 1,000 hours, even though the initial tension is only 60% of the tension on the high strength PET strap. The high strength polypropylene strap indicated as 106 had a much more severe drop—which is what might be expected with this type of material.

TABLE 1

EXAMPLES OF DIFFERENT PROCESSING CONDITIONS WITH RESULTANT PROPERTIES

|  | Example No. 1 | | | Example No. 2 | | | Example No. 3 3a | | | | Example No. 4 | | |
|---|---|---|---|---|---|---|---|---|---|---|---|---|---|
|  | Stage 1 | Stage 2 | Stage 3 | Stage 1 | Stage 2 | Stage 3 | Stage 1 | Stage 2 | Stage 3 | With surface treatment | Stage 1 | Stage 2 | Stage 3 |
| Temperature (°F.) | 175 | 250 | 75 | 175 | 250 | 190 | 175 | 250 | 270 | — | 175 | 250 | 330 |
| Draw Ratio | 3.7 | 1.35 | 1.2 | 3.7 | 1.35 | 1.2 | 3.7 | 1.35 | 1.35 | — | 3.7 | 1.35 | 1.4 |
| Resultant Properties | 3.7 | 5.0 | 6.0 | 3.7 | 5.0 | 6.0 | 3.7 | 5.0 | 6.75 | — | 3.7 | 5.0 | 7 |
| Total Draw Ratio |  |  |  |  |  |  |  |  |  |  |  |  |  |
| Surface Treat Depth (mils) | 0 | 0 | 0 | 0 | 0 | 0 | 0 | 0 | 0 | 1.0 | 0 | 0 | 0 |
| Tensile Strength | — | 58 | 73 | — | 58 | 105 | — | 58 | 140 | 125 | — | 58 | 150 |
| Elongation | — | 28 | — | — | 28 | — | — | 28 | 10 | 10 | — | 28 | 7 |
| Crack Length | — | 0 | 0 | — | 0 | 0.1 | — | 0 | 1.1 | 0.25 | — | 0 | 2.1 |

When the material is PET, this results in highly orientated strap which has high break strength and also demonstrates improved properties with respect to brittleness, one manifestation of which is the tendency for the strap to split along its length when under tension. It has also been found that the temperature range of the third stretching stage is particularly important with respect to controlling the amount of brittleness. By stretching at higher temperatures, the high strength strap tends to be more brittle and more likely to separate along its length, whereas improved ductility can be obtained at a lower temperature. Table 1 also shows, in Example 3a, a substantial benefit in the form of reduced crack length (brittleness) which results from the surface treatment of the Example 3 product.

Creep

Figure 3:
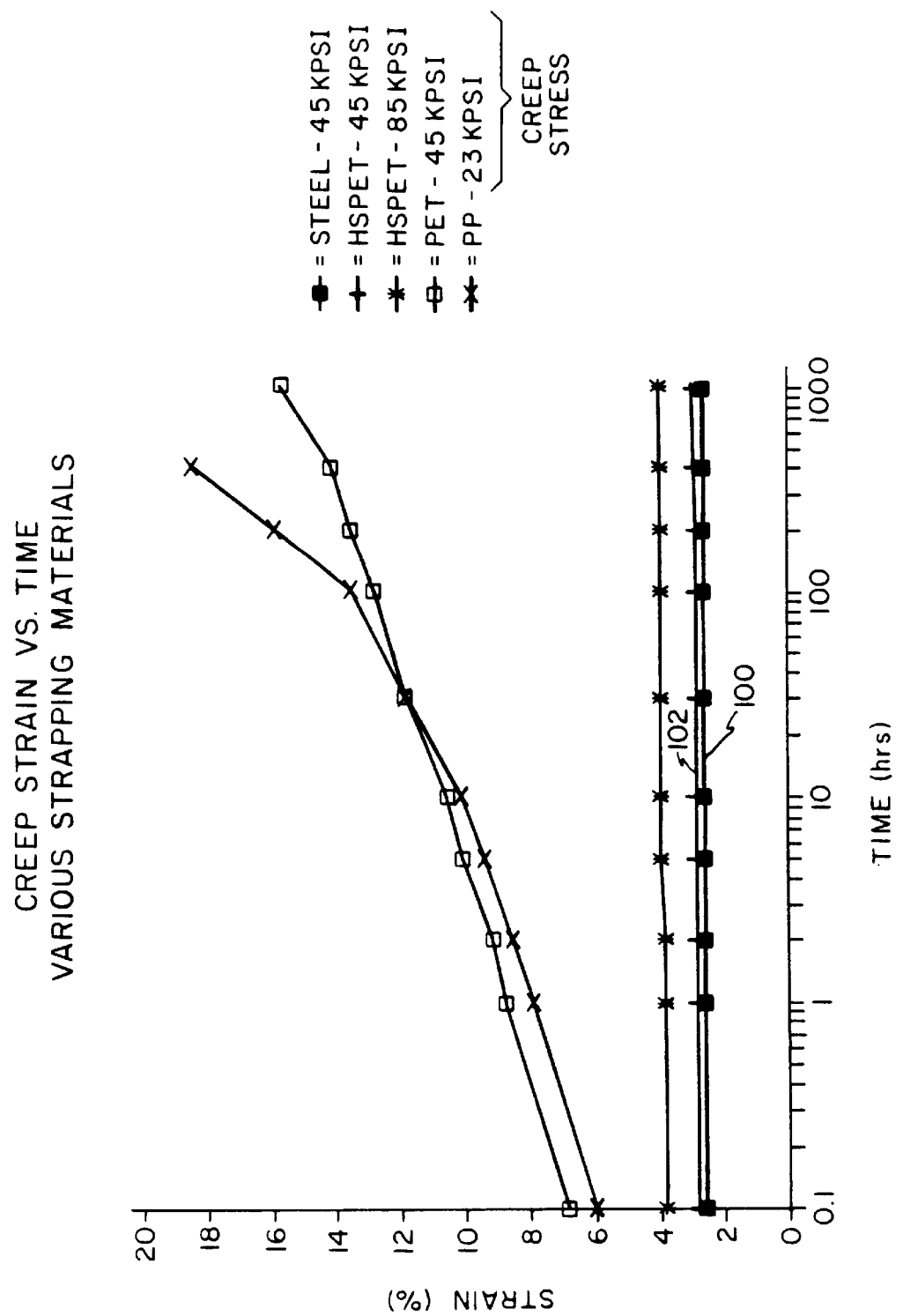
FIG. 3 is a creep strain versus time graph showing high tensile strength steel, high strength polyethylene terephthalate according to the present invention and conventional polyethylene terephthalate strap.

FIG. 3 shows creep strain versus time for various strapping materials. It can be seen that the high tensile strength steel 100 essentially had no creep strain increase from its initial point for 1,000 hours. Similarly, the high strength PET strap 102 has the same flat line characteristic as conventional steel strap. Conventional PET strap loaded to a creep stress of 45,000 psi has a substantial creep strain over the 1,000 hour time period and high strength polypropylene strap has a high creep strain (even at half the creep stress used to test the high strength PET) which increases with time.

Stress Relaxation

Figure 4:
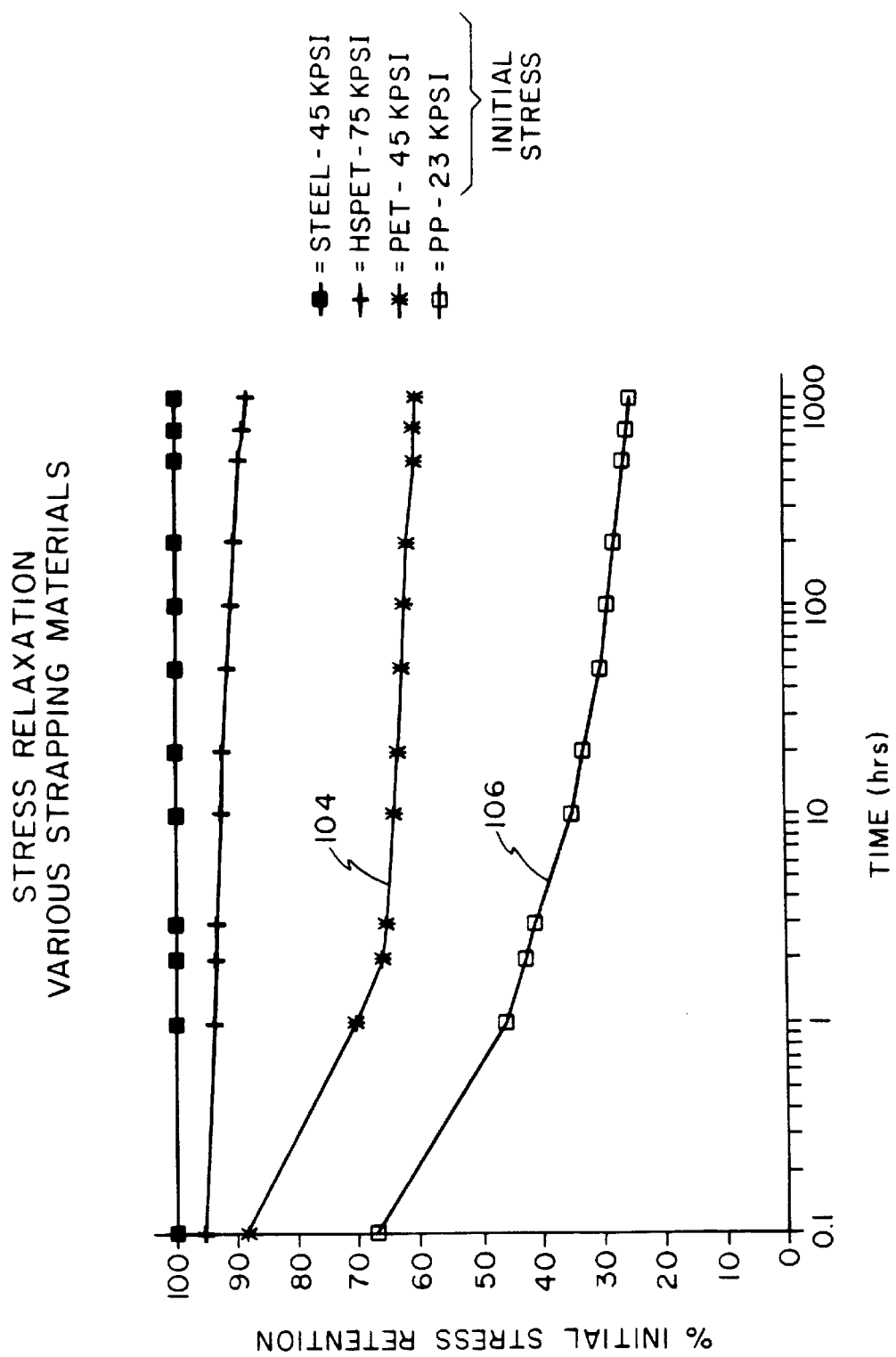
FIG. 4 is a stress relaxation graph of various strap products.

FIG. 4 shows the stress relaxation properties of a) high tensile steel strap; b) a high strength PET strap made in Joint Strength According to one aspect of the invention, it has been found that the PET strap can be manufactured with an a amorphous layer on both sides, which improves the ease with which the strap may be effectively joined. When conventional hot knife fusing techniques are used, the amorphous layer of the present invention has been found to improve the strap's ability to resist progressive separation between the joined layers of the strap at the weld. When a joint in the strap of the present invention is formed by welding a sufficiently large area of the amorphous layer on one side of the strap to the amorphous layer on the opposite side of the strap, the high strength underlying layer of the strap then effectively determines the maximum break strength of the strap/joint combination. Preferably, the outer layer is of a depth of at least 0.0005 inch, and is amorphous. It has been found that a joint having a break strength of at least 75% of the break strength of the high strength layer is easily accomplished. This percentage is referred to as joint efficiency. The outer layer of the strap of the present invention enables the increased break strength obtained by using the proposed orientation methods to be utilized.

Table 2 below shows various straps and their joint strengths. The joints with the plastic straps are based on hot knife welds, whereas the strength based on the high tensile steel strap is based on a sealess joint. As can be seen from Table 2, the high strength PET strap, surface treated on both sides, has a high joint efficiency and high break load due to the high ultimate strength of the underlying layer. In this case, a break strength of 1660 lbs. was achieved. Therefore, the high efficiency weld in combination with the high strength of the plastic strap gives a very high maximum load and properties which can greatly increase the applications for plastic strap.

TABLE 2

JOINT STRENGTH

| STRAP | Break Strength (KSPI) | Break Load (Lbs.) | Joint Strength as % of Break Load | Joint Strength (Lbs.) |
|---|---|---|---|---|
| High Tensile Steel (¾" × .020") | 140 | 2100 | 76% | 1600* |
| High Strength PET (w/o Surface Treatment) (½" × 0.030") | 145 | 2175 | 32% | 700** |
| High Strength PET Surface Treated (½" × 0.30") | 130 | 1950 | 85% | 1660** |
| Conventional PET (⅝" × .032") | 65 | 1300 | 80% | 1040** |

*SEALESS JOINT
**HOT KNIFE WELDS

Figure 5:
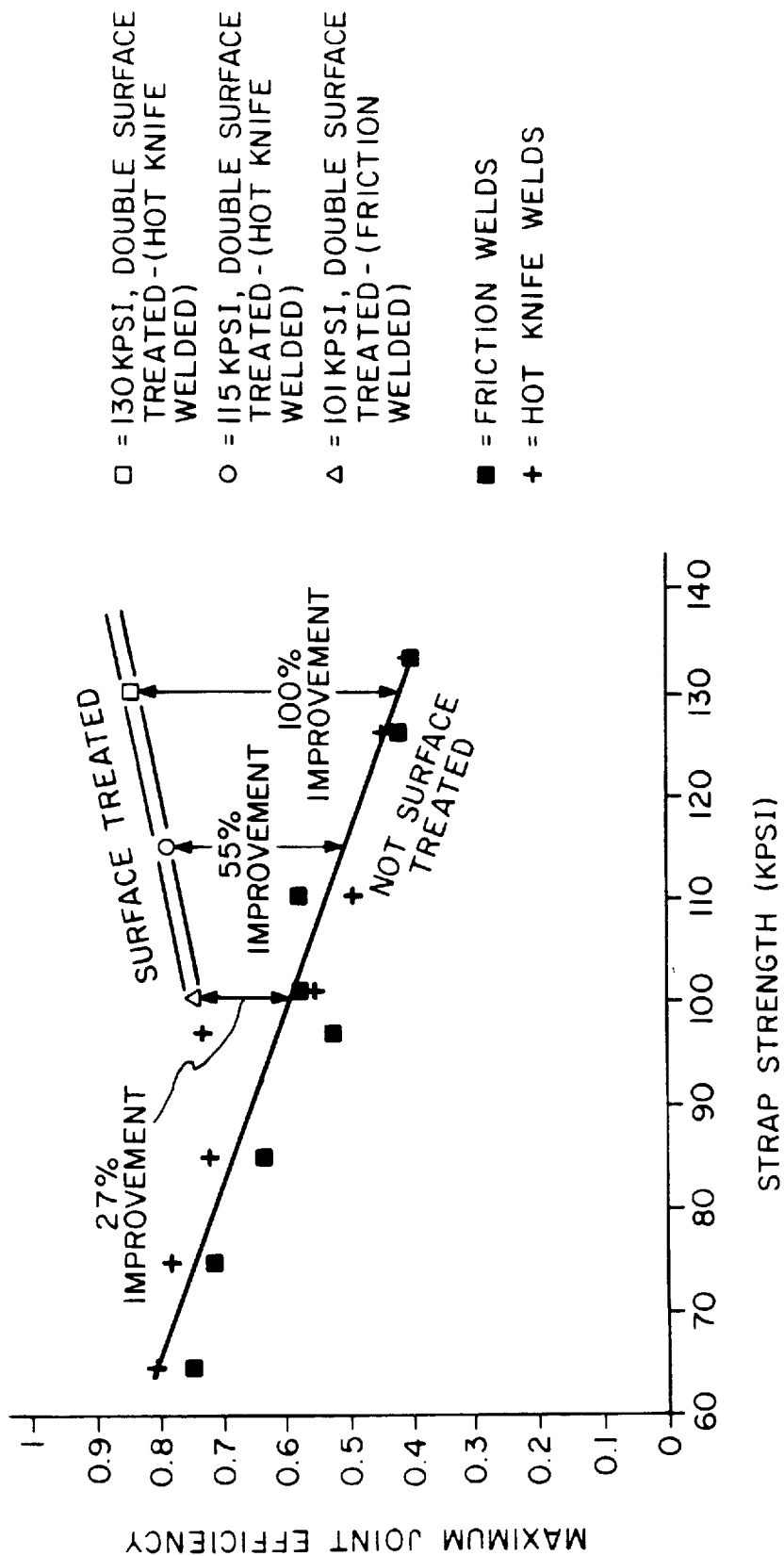
FIG. 5 is a plot of strap strength versus joint efficiency.

Both surfaces of the strap are treated to obtain a thin surface layer. Treating a PET strap with the surface treatment of the present invention results in a lowering of the strength of the strap by about 11%, i.e. from an initial (without surface treatment) strength of 147 kpsi to a treated strength of about 130 kpsi. FIG. 5 shows the effect of surface treating on the maximum joint efficiency of high strength PET strap. The surface treating depth, as determined by optical microscopy, was 0.0015" per side on a strap 0.021" thick. The 130 kpsi, double surface treated PET strap was welded by hot knife welding. With a surface treatment of the present invention, the strap had a joint efficiency of 0.85. Also tested were 115 kpsi and 101 kpsi strength, double surface treated PET strap samples with single surface melting depths of 0.0015" and 0.0017", respectively. Their maximum joint efficiencies were 0.79 and 0.75, respectively.

Observation of weak and strong welds of double surface treated, high strength PET strap indicates that the weak welds were those where the welding process destroyed the surface layer, thus exposing the oriented material that is susceptible to crack initiation. The strong welds were those in which the surface melted layer adjacent to the ends of the welds was intact, thus protecting the core oriented material from crack initiation.

The surface fracture energy in the machine direction of oriented polyester, as determined by standard tear and cleavage tests, is usually a small percentage of the fracture energy of the unoriented material. The surface fracture energy of a material is a measure of the ability of the material to withstand formation of new fracture surfaces. A material with high surface fracture energy is much more resistant to crack initiation and/or propagation.

The amorphous layers at the ends of the welds are believe to resist crack initiation as a lap joint is loaded. This resistance allows the joint to carry more load before failure, thus resulting in a higher joint strength and efficiency.

Brittleness

Although high strength PET strap made in accordance with the present invention can be produced by using a third stretching stage temperature from about 75° F. up to 330° F., the preferred range for producing high strength PET strap is below about 200° F., unless brittleness is not a concern. Although it is believed 200° F. is the maximum temperature in the third stage of drawing, for applications where brittleness is not an important factor, higher temperatures may be used to obtain higher strength strap. FIG. 6 is a graph showing the effect of drawing temperature on brittleness. The line on the graph shows points of maximum attainable strength of various drawing temperatures. The data in the graph is for strap treated with three drawing stages, and the drawing temperatures along the horizontal axes of the graph are for the temperatures of the third drawing stage only. The first two drawing steps were conducted at temperatures corresponding to those used to make conventional PET strap. It should also be noted that the data in the graph of FIG. 6 is for strap which had no outer surface of amorphous material.

As shown below, there is a significant relationship between strap brittleness and increased depth of surface treatment. Table 3 illustrates the percentage improvement in crack length with surface treating depth.

TABLE 3

Effect of Surface Treating Depth on Strap Brittleness

| Surface Treating Depth* (mils) | Crack Length (in)[xx] | % Improvement |
|---|---|---|
| 0 (128 kpsi) | 1.82 | N/A |
| 0.8 (121 kpsi) | 1.39 | 24 |
| 1.2 (113 kpsi) | 0.87 | 52 |
| 2.0 (96 kpsi) | 0.32 | 82 |

*Single surface treat depth
[xx]Crack length was measured by using a Split Test. This test comprises the application of a steel pointed penetrator into a strap sample at a controlled rate and depth of penetration. This sequence is automated on a pneumatically driven, solenoid activated apparatus for rapid and reptitive penetrator applications. After 20–30 cracks have been produced, they are individually measured and the average is obtained.

The surface of the high strength PET strap of one embodiment of the present invention is treated to produce a thin melted skin on the strap surface. Melting the skin on the strap results in some strength loss, which loss is dependent on the surface treating depth. When a strap with a thin amorphous layer is welded, it is believed that the amorphous layer provides the joint with a high crack initiation resistant (fracture energy) material which suppresses crack initiation at the ends of the lap joint under load.

Effect of Surface Treating on Corner Strength

The purpose of strapping is to hold packages or products in place during shipment. The initial application of strapping involves the tensioning of the strap around the product or package. Items requiring strapping have various ranges of corner radii for a strap to follow. In cases where the radius is very small (e.g. when strapping bricks), the strap can experience very high bending and tensile strains on the outer surface side of the strap around a corner. High strength PET strap has a much lower tensile failure strain (10–12%) as compared to conventional PET strap (20–30%). Thus, the ability of high strength PET strap to perform in applications where radii are sharp is an important consideration.

Strap having an initial strength of 147 kpsi was surface treated to produce an amorphous surface layer of 0.0015" on each side, and the resulting strap had 130 kpsi strength. Strap with surface treatment showed an increase in corner strength by a factor of about 4 as compared to untreated high strength strap. In another test, it was found that high strength PET strap which was not surface treated had a 22,000 psi corner strength, whereas the same strap which had been surface treated on either side thereof to produce an amorphous layer of about 0.0012 of an inch had a corner strength of 63,000 psi. Therefore, surface treating high strength PET strap produces improved corner strength over the untreated, high strength PET strap. This is believed to be due to the creation of a surface layer capable of a high degree of elongation which can stretch to higher strains without failure.

Effect of Surface Treating on Strap Thickness Profile

The manufacture of conventional plastic strapping via the individual strand process results in a strap which is thicker on the edges of the strap than in the center. This is a result of the way in which the strand exits the extrusion die before being drawn, and also of the drawing process itself. Slit strap is produced from rolled sheets and therefore dimensions can be more accurately maintained. A flat profile allows for the formation of efficient friction welded joints. Welding techniques are not known to be as efficient for strap produced by a strand process due to the curved profile of such strap. The presence of peaks can result in welds that possess voids and other interface variations which result in lower joint strength relative to comparable strap made via a sheet slitting process where the strap is much more uniform.

The surface treating of the present invention produces improved uniformity in the thickness profile across the strap width. Typically, strap produced at 0.023" thickness has a profile that possesses a maximum thickness variation across the width of plus or minus 0.0001", and strap produced via a conventional individual strand process typically has a thickness variation across the width of plus or minus 0.0005". Melting of the surface in accordance with the present invention smooths out the peaks in the strap thickness, producing, in effect, a flat strap. This results in improved weld strengths and allows use of the strap made by the individual strand technique in strapping machines that normally require strap made by the sheet-slit technique.

Preferably, the surface layers are produced by passing the strap over heated rollers, but may also be done with hot air, flame or other melting techniques. This allows strap made as single strand to effectively compete with sheet slit strap. This is of significant commercial importance for manufacturers of individual strand strap.

Mechanical Properties

The creation of an amorphous skin on the surface of high strength PET strap reduces its load bearing capacity because of the low strength amorphous layer making up some of the strap crosssectional area. As the depth of the surface treating layer increases, the strength of the overall strap will decrease (see Table 4 below). The upper limit of the melt depth range is determined by the strength required in the final strap. For practical purposes, the total strength drop should probably not exceed 25% of the original strap strength, otherwise the benefit of the strengthening which results from orientation is significantly diminished. The lower limit of the surface treatment is about 0.0005", which is the lowest practical value reproducible on conventional equipment. Conventional PET strap is manufactured in the 0.20"–0.040" range. Thus, the practical range of melt depth is about 0.0005" to about 0.005". The preferred range is about 0.0005" to about 0.003", depending on the strap thickness. In terms of percent, the range is from about 0.6% to about 12.5%, with the preferred range being from about 1% to about 7.5%.

TABLE 4

Effect of Surface Treating on Mechanical Properties

| Total Melt Depth (mils) | Strap Strength (kpsi) | Strap Modulus (kpsi) | Strap Elongation (%) |
|---|---|---|---|
| 0 | 128.7 | 1666 | 11.0 |
| 1.63 | 121.3 | 1462 | 11.7 |
| 2.4 | 112.8 | 1413 | 10.8 |
| 3.9 | 103.8 | 1373 | 11.0 |
| 4.1 | 96.3 | 1249 | 11.8 |

In addition to improvements in tensile strength obtained by the strap of the present invention, tensile modulus, or stiffness, of the strap is also improved. The term stiffness is more commonly used in the strapping field. Increased stiffness is important in strapping because strap must be stiff enough to be fed through chutes in strapping machines. This is particularly important in large strapping machines because the chutes are longer. Longer chutes means that buckling and jamming in the machine are more likely. Low stiffness limits the use of certain sizes of polypropylene (PP) strapping.

Table 5 below indicates typical tensile moduli values of conventional PP and PET strap, along with various strength and high strength PET strap. Most strapping applications in large strapping machines require a strap with substantial stiffness, which may be achieved by a combination of high tensile modulus and increased strap thickness.

TABLE 5

Typical Moduli of Plastic Strapping

| Strap | Modulus (kpsi)*** |
|---|---|
| PP (54 kpsi) | 319 |
| Conventional PET (65 kpsi) | 967 |
| 75 kpsi H.S. PET* | 1052 |
| 85 kpsi H.S. PET* | 1071 |
| 97 kpsi H.S. PET* | 1152 |
| 101 kpsi H.S. PET* | 1205 |
| 110 kpsi H.S. PET* | 1239 |
| 126 kpsi H.S. PET* | 1358 |
| 133 kpsi H.S. PET* | 1596 |
| 147 kpsi H.S. PET* | 1799 |
| 143 kpsi H.S. PET* | 1921 |

*Strap made at 300° F.
**Strap made at 500° F.
***Tested at 0.2% offset

Table 5 shows that high strength PET strap made in accordance with the present invention shows a marked improvement in tensile modulus, as compared with conventional PET strap, and is far superior to polypropylene strap in tensile modulus.

Although various preferred embodiments of the present invention have been described herein in detail, it will be appreciated by those skilled in the art, that variations may be made thereto without departing from the spirit of the invention or the scope of the appended claims.

We claim:

1. A method of manufacturing strapping comprising the steps of:

passing a polyester or polyester copolymer material through a series of godet rolls at least three separate times such that the total stretch ratio to which said material is subjected is at least 5.0 to 1.0, orienting the material to an extent sufficient to produce a strap having a break strength of at least 70,000 psi, while said strap is below room temperature, exposing surface areas of said strap to a heated surface sufficient to cause the material of said strap at said surface areas to lose its orientation, thereby creating an amorphous layer on said strap.

2. A method of manufacturing strap in accordance with claim 1 wherein:

said method includes the step of forming a outer layer of amorphous polymer on at least one side of said material.

3. A method of manufacturing strap in accordance with claim 1 wherein:

said method includes the step of forming a outer layer of amorphous polymer on both sides of said material.

4. A method of manufacturing strap in accordance with claim 3 wherein:

said method includes a step of extruding a core material and forming said outer layer on both sides of said core material by coextruding said outer layer with said core material.

5. A method of manufacturing strap in accordance with claim 1 wherein:

said material is at a temperature in a range of about 175° F. to 250° F. as said material stretched by said godet rolls for a first and second time, and;

said material is at about room temperature as it is stretched by said godet rolls for a third time.

6. A method of manufacturing scrap in accordance with claim 1 wherein:

said step of forming said outer layer is comprised of the steps of:

in said material to a temperature below about room temperature, while said strap is below room temperature, exposing surface areas of said strap to heat sufficient to cause said material to melt for short periods of time and causing the material of said strap at said surface areas to lose its orientation, thereby creating an amorphous layer on said strap, chilling said material after forming said amorphous layer to prevent said core from rising to a temperature which would cause said core to lose a substantial amount of its orientation and increase its brittleness.

7. A method of manufacturing strap in accordance with claim 1 wherein:

said stretch ratio of the strap is at least 6.0 to 1.

8. A method of manufacturing strap in accordance with claim 2 wherein:

at least about 60% of the orienting of said strap occurs in the first stretch stage.

9. A method of manufacturing strap in accordance with claim 1 wherein:

orienting of said material for a third time occurs at a temperature within a range of between 75° F. to about 330° F.

10. A method of manufacturing strap in accordance with claim 1 wherein:

said method is carried out using polyethylene terephthalate or copolymer thereof as said material.

11. A method of manufacturing strapping comprising the steps of:

passing a polyester or polyester copolymer material through a series of godet rolls such that the total ratio to which said material is subjected is at least 5.0 to 1.0, at least one of said times occurring when said material is in an environment where the temperature is below about 175° F.

* * * * *